(12) United States Patent
Jakoubovitch et al.

(10) Patent No.: US 10,685,783 B2
(45) Date of Patent: Jun. 16, 2020

(54) CAPACITOR AND METHOD OF MANUFACTURING THEREOF

(71) Applicant: CELEM PASSIVE COMPONENTS LTD, Jerusalem (IL)

(72) Inventors: Benjamin Jakoubovitch, Jerusalem (IL); Anat Jakoubovitch, Jerusalem (IL)

(73) Assignee: CELEM PASSIVE COMPONENTS LTD, Jerusalem (IL)

( * ) Notice: Subject to any disclaimer, the term of this patent is extended or adjusted under 35 U.S.C. 154(b) by 0 days.

(21) Appl. No.: 15/729,397

(22) Filed: Oct. 10, 2017

(65) Prior Publication Data

US 2018/0033558 A1    Feb. 1, 2018

Related U.S. Application Data (63) Continuation of application No. 14/770,736, filed as application No. PCT/IL2014/000026 on May 27, 2014, now Pat. No. 9,865,398.

(Continued)

(51) Int. Cl.
| | |
|---|---|
| H01G 4/32 | (2006.01) |
| H01G 4/232 | (2006.01) |
| H01G 4/005 | (2006.01) |
| H01G 2/10 | (2006.01) |
| H01G 4/224 | (2006.01) |
| H01G 4/38 | (2006.01) |
| H01G 4/228 | (2006.01) |

(52) U.S. Cl.
CPC ............... *H01G 4/32* (2013.01); *H01G 2/106* (2013.01); *H01G 4/005* (2013.01); *H01G 4/224* (2013.01); *H01G 4/228* (2013.01); *H01G 4/232* (2013.01); *H01G 4/38* (2013.01)

(58) Field of Classification Search
CPC .................................. H01G 4/32; H01G 4/18
See application file for complete search history.

(56) References Cited

U.S. PATENT DOCUMENTS 1,890,313 A * 12/1932 Caine .................... H01G 4/228
                                                   361/303
3,689,811 A    9/1972 Hoffman
(Continued)

OTHER PUBLICATIONS

Celem Power Capacitors, http://wayback.archive.org/web/20120814010519/http://www.celemcom/index.aspx?id=2859; published Aug. 14, 2012; downloaded Aug. 31, 2014; first page.

(Continued)

*Primary Examiner* — Eric W Thomas
(74) *Attorney, Agent, or Firm* — Smith Tempel Blaha LLC; Gregory Scott Smith (57) ABSTRACT

An alternating current power capacitor including one or more capacitor bodies (e.g., bobbins) having conductive and dielectric film windings, wherein edges of the conductive film windings define a plane forming at least one capacitor body contact surface, one or more electrodes having one or more electrode contact surfaces and a housing operative to apply compressive force that binds the capacitor body and electrode together so as to maintain uniform electrical and thermal conductive contact throughout a plane parallel to and between the electrode contact surface and capacitor body contact surface.

9 Claims, 8 Drawing Sheets

Related U.S. Application Data

(60) Provisional application No. 61/838,287, filed on Jun. 23, 2013.

(56) References Cited

U.S. PATENT DOCUMENTS

| | | |
|---|---|---|
| 6,370,009 B1 | 4/2002 | Fellers et al. |
| 7,002,789 B1 | 2/2006 | Georgopoulos |
| 8,373,970 B2 | 2/2013 | Jakoubovitch |
| 2010/0315761 A1* | 12/2010 | Georgopoulos ....... H01G 4/224 361/327 |
| 2012/0229948 A1* | 9/2012 | Sawyer .................... H01G 4/32 361/301.1 |
| 2016/0005544 A1 | 1/2016 | Jakoubovitch et al. |

OTHER PUBLICATIONS

International Search Report dated Oct. 29, 2014 for PCT/IL14/000026.

\* cited by examiner

FIG. 1A (PRIOR ART)

FIG. 1B (SECTION A-A)

FIG. 2C
(SECTION A-A)

CAPACITOR AND METHOD OF MANUFACTURING THEREOF

TECHNICAL FIELD

The current method and system relate to power capacitors and in particular to high frequency, high voltage power capacitors.

BACKGROUND

High voltage alternating current (AC) power capacitors are designed to meet the mechanical, electrical, and performance requirements of high voltage high frequency AC electrical circuits. Such capacitors commonly used in electrical circuits carrying peak voltages of, for example, $1400V_{peak}$ and electrical current of 3000 $A_{rms}$ are prone to ohmic, dielectric and inductive energy losses mainly in the form of heat. For example, in a common high and medium frequency (e.g., 1 kHz to 1 MHz) power capacitor each 500 kvar reactive power can generate a loss of 500 to 1000 Watt in the form of heat.

High voltage power capacitors are commonly multi-layered capacitors such as, for example, film capacitors that are made of alternating layers of a conducting material such as, for example, aluminum foil and a dielectric, such as, for example polypropylene film and are either layered into flat layers or rolled into a spool or a bobbin. Other dielectric materials can include polyester (Mylar®), polystyrene, polypropylene, polycarbonate, metalized paper, Teflon® and others. Electrodes are then either thermally bonded by, for example soldering or mechanically connected by, for example connectors to one or more edges of each of the external conductive layers on either side of the layered capacitor body or to each flat end of the bobbin, formed by edges of the conducting film windings.

The assembled capacitor is commonly potted thus providing isolation of the capacitor body or bobbin from the environment leaving only the electrodes exposed.

Though soldering provides a solid attachment between the electrodes and the capacitor body contact surface there are some disadvantages associated with soldering. Tin is commonly used as a soldering material and solder points act to transfer heat from the capacitor body (commonly aluminum-dielectric layers) to the electrode (commonly copper) and/or the environment by heat conduction and dissipation. However, in power capacitors, tin solder forms two interfaces: a capacitor body (commonly aluminum-dielectric layers)—tin interface and a tin-electrode (commonly copper) interface, which creates thermal junctions bringing about elevated junction temperature during capacitor operation.

The soldering tin, though a reasonable electrical conductor, still could have a resistance contributing to energy losses in such power capacitors.

There have been attempts to provide connections between two capacitor bodies arranged in series. U.S. Pat. No. 4,307,434 discloses a conductive sleeve or conductive tabs that are pressed between the layered capacitor conductive layers and "short circuit" two capacitors arranged in series.

U.S. Pat. No. 6,370,009 discloses replacing conventional soldering operations by crimping a wire to a foil edge of a capacitor.

Other solutions such as streaming cooling fluid through the capacitor housing or electrodes so as to drain heat away from the capacitor provide only a partial solution. In plastic films layered capacitors, the dielectric component/layers melt and/or disintegrate easily at temperatures of about 120 degrees Celsius whereas the soldering temperature may commonly reach over 200 degrees Celsius.

Soldering under water-cooling conditions alone allows for quick point soldering only (creating heat junctions) and does not enable soldering large areas between the capacitor body contact surface and the electrode since the high soldering temperatures generated by soldering large surface areas may damage the capacitor body by melting or disintegrating the dielectric component.

Additionally, since aluminum (capacitor body) cannot be directly soldered to copper (electrode) an intermediate bonding material must be added such as copper or tin-zinc powder that is arc sprayed over the surface of the capacitor body contact surface creating additional interfaces and thermal junctions.

The limitations of soldering as explained above also negate the option of assembling a double-body capacitor in which the capacitor bodies are arranged in series.

SUMMARY

The present disclosure seeks to provide an alternating current (AC) power capacitor that minimizes thermal junctions at points of contact between the capacitor body (e.g. bobbin) and attached electrodes so as to minimize Ohmic, dielectric and inductive energy losses—mainly in the form of heat.

In accordance with an example, there is thus provided a capacitor including one or more capacitor bodies having conductive and dielectric film windings and wherein edges of the conductive film windings protrude beyond the edges of the dielectric film windings and define a plane forming at least one capacitor body contact surface, one or more electrodes having one or more electrode contact surfaces and a housing operative to apply compressive force operative to bind the capacitor body and electrode together so as to maintain uniform electrical and thermal conductive contact throughout a plane parallel to and between the electrode contact surface and capacitor body contact surface.

The electrode could be flat so as to contact as many conductive film windings as possible.

In accordance with another example there is provided a capacitor including two or more capacitor bodies in series having conductive and dielectric film windings and, wherein edges of the conductive film windings protrude beyond the edges of the dielectric film windings and define a plane forming one or more capacitor body contact surfaces one or more electrodes (one of which is disposed between the capacitor bodies) and having two electrode contact surfaces and a housing operative to apply compressive force. The compressive force being operative to bind the capacitor body and electrodes together so as to maintain uniform electrical and thermal conductive contact throughout a plane parallel to and between the electrode contact surface and capacitor body contact surface.

In accordance with yet another example there is provided a capacitor body, a first electrode having one or more through holes and one or more electrode contact surfaces abutting and contacting at least a first capacitor body contact surface. Further including a second electrode having one or more threaded sockets and one or more electrode contact surfaces abutting and contacting a second capacitor body contact surface so as to sandwich the capacitor body between the electrodes and one or more bolts isolated from the first electrode and operative to be passed through the through hole and be threaded into the threaded socket so that when rotated the bolts urge the first and second electrodes towards each other and against the capacitor body generating a compressive force and maintaining uniform electrical and thermal conductive contact throughout a plane parallel to and between the electrode contact surface and capacitor body contact surface.

In accordance with still another example there is also provided a method of manufacture of a capacitor including arranging one or more capacitor bodies having conductive and dielectric film windings and wherein edges of the conductive film windings define a plane forming at least one capacitor body contact surface and one or more electrodes having a rim and one or more electrode contact surfaces to abut each other, placing the arranged electrode and capacitor body in a jig between two parallel movable plates and bringing the jig plates towards each other.

Employing the parallel movable plates and applying compressive force on the electrode and capacitor body to bind the electrodes and capacitor body together and establish and maintain uniform electrical and thermal conductive contact throughout a plane parallel to and between the electrode contact surface and capacitor body contact surface.

Encapsulating and potting the capacitor while still maintaining the capacitor under the compressive force of the jig parallel plates. When encapsulating the potting flows over and engulfs the rim of the electrode. Once encapsulation is dry removing the capacitor from the jig. Contact between the electrodes and the capacitor body is maintained under compressive force applied by the mechanical strength of the polyurethane.

BRIEF DESCRIPTION OF THE DRAWINGS

The present method and system will be understood and appreciated more fully from the following detailed description, taken in conjunction with the drawings in which.

DETAILED DESCRIPTION

The terms "Capacitor Body", "Conductor-Dielectric Layers", "Layered-Plates", "Spool" and "Bobbin" are used interchangeably in the current disclosure and mean the core of a capacitor that stores electrical energy.

The term "Capacitor" as used in this disclosure means a capacitor body connected to one or more electrodes.

The terms "Force" and "Pressure" are used interchangeably in the current disclosure, have the same meaning and describe mechanical action applied to a capacitor binding and maintaining the elements of the capacitor (i.e., electrodes and capacitor body) together.

Figure 1A:
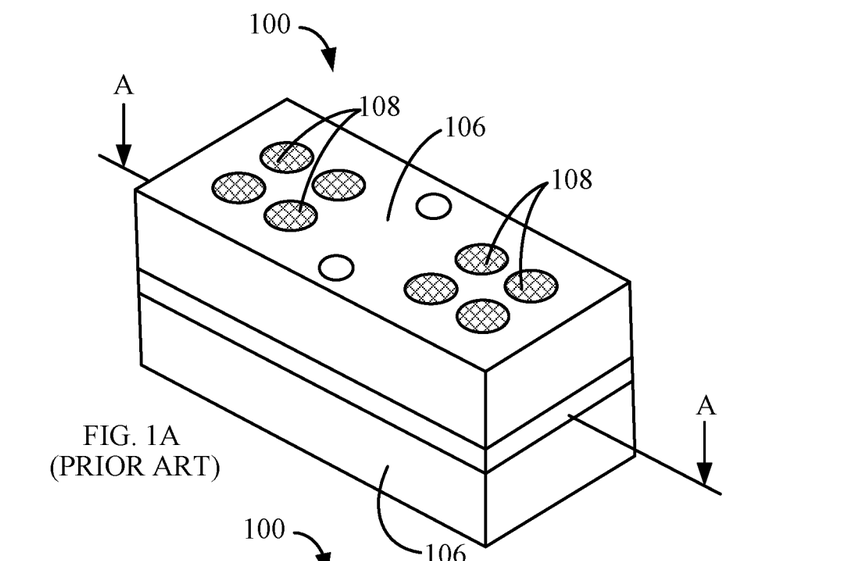
FIGS. 1A and 1B are a perspective-view and a cross-section view simplified illustrations of a commonly used power capacitor.
Figure 1B:
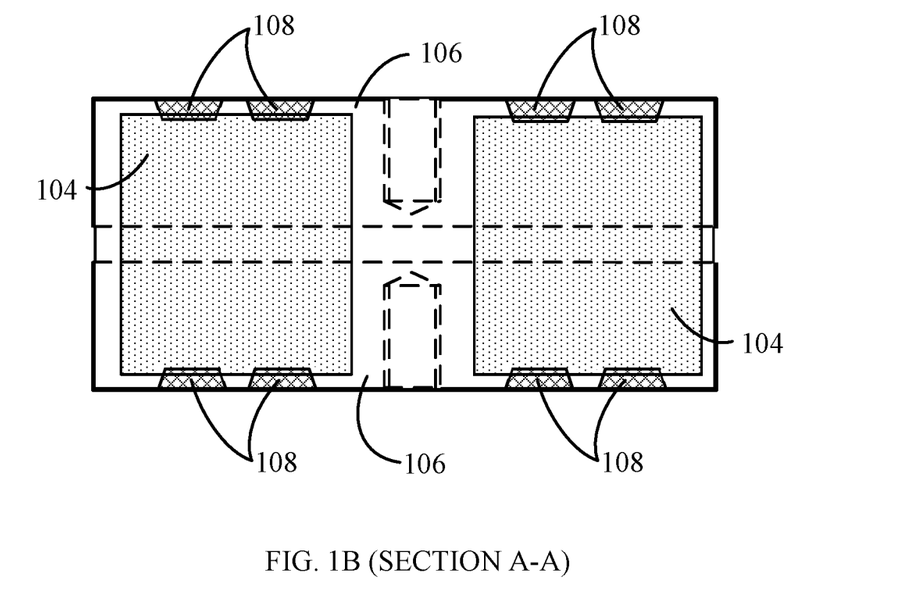

Reference is now made to FIGS. 1A and 1B, which are a perspective view and a cross-section view simplified illustrations of a commonly used alternating current (AC) power capacitor. A power capacitor 100 commonly includes one or more capacitor bodies 104 such as bobbins or a layered-plates and electrodes 106, commonly made of copper and soldered to bodies 104 via soldering points 108.

Figure 2A:
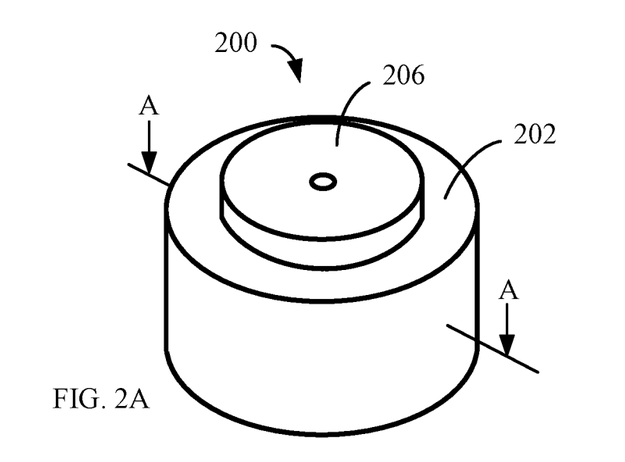
FIGS. 2A, 2B and 2C are a perspective view and a cross-section view simplified illustrations of an example of a power capacitor.
Figure 2B:
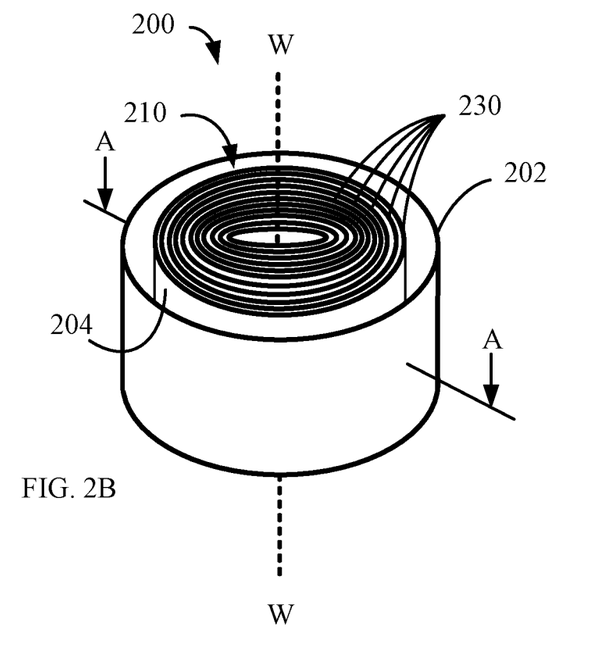
Figure 2C:
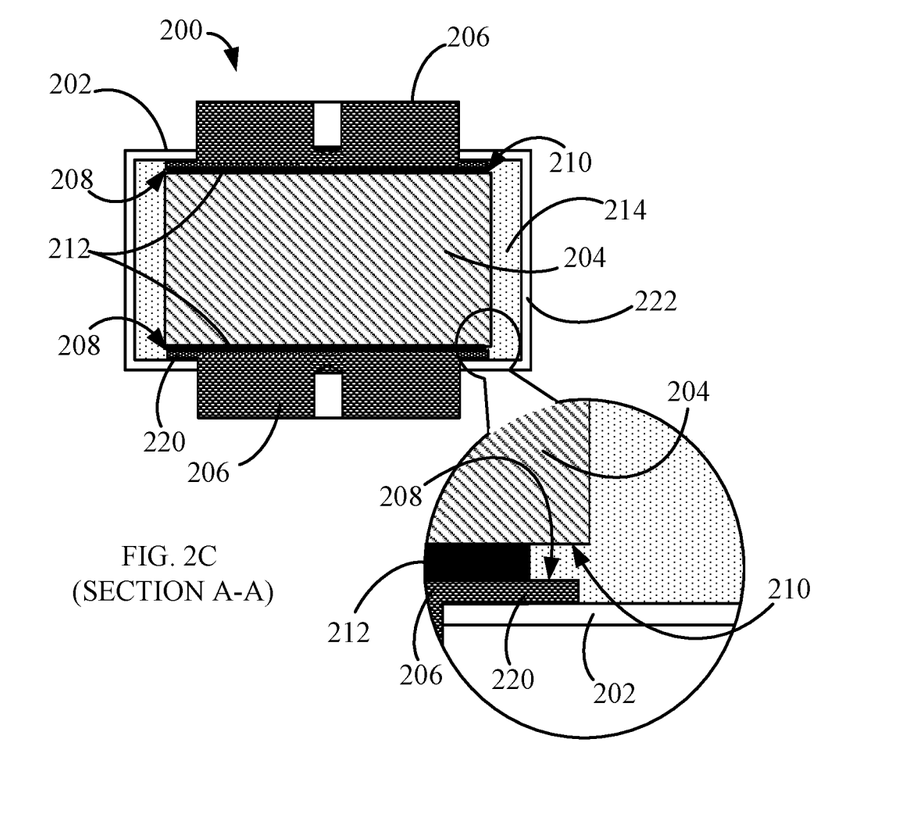

Referring now to FIGS. 2A, 2B and 2C, which are a perspective view and a cross-section view simplified illustrations of an example of a power capacitor.

Power capacitor 200, which can be an alternating current (AC) capacitor, includes a housing 202 operative to accommodate a bobbin 204 and two or more electrodes 206 that can, but not necessarily protrude from opposite sides of housing 202.

In FIG. 2B, electrode 206 and part of housing 202 have been removed for purposes of explanation to expose bobbin 204 inside housing 202. Bobbin 204 includes alternating conductive and dielectric film windings concentrically arranged around an axis (W). Edges 230 of the conductive film windings slightly protrude beyond edges (not shown) of the dielectric film windings and define a plane normal to axis (W) forming two capacitor body contact surfaces 210, one on each of opposing flat sides of bobbin 204.

Conductive film windings could be made of a conductive material such as but not limited to aluminum or zinc. Dielectric film windings can be made of a dielectric such as but not limited to polyester (Mylar®), polystyrene, polypropylene, polycarbonate, metalized paper, Teflon® and others. Electrodes 206 could be made of, but not limited to copper.

Electrodes 206 can include a contact surface 208 having a surface area sufficiently large so that when assembled, electrode 206 contact surface 208 can come in contact with most, if not all of edges 230 of the conductive film windings constituting body contact surface 210. Commonly, when assembled, an electrode 206 contact surface 208 can come in contact with over 50% of edges 230 of the conductive film windings constituting a body contact surface 210. More commonly, when assembled, an electrode 206 contact surface 208 can come in contact with over 75% of edges 230 of the conductive film windings constituting a body contact surface 210 and most commonly, when assembled, an electrodes 206 contact surface 208 can come in contact with over 90% of edges 230 of the conductive film windings constituting a body contact surface 210. The surface area of electrodes 206 contact surface 208 can be larger, the same or smaller than the surface area of capacitor body contact surface 210.

Optionally but not necessarily, electrodes 206 contact surface 208 and capacitor body contact surface 210 can sandwich an electric and heat conductive layer 212 disposed there between. Electric and heat conductive layer 212 can be made of an electrically and heat conductive material selected from a group of materials including copper and a zinc-tin mixture commonly in a wire or powder form and applied to capacitor body contact surface 210 by arc or flame spray as will be explained in greater detail below.

Figure 3:
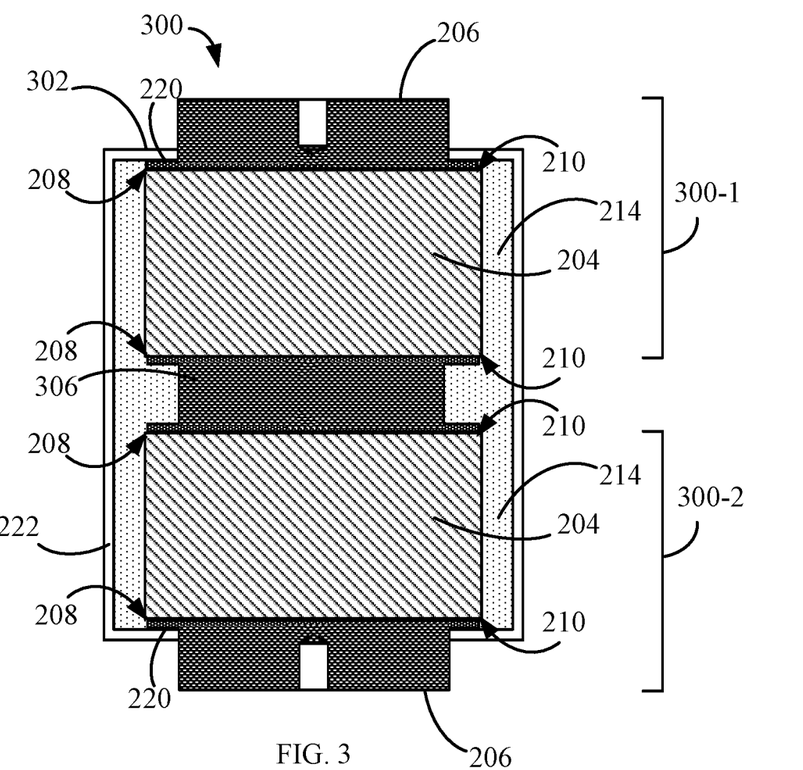
FIG. 3 is a cross-section view simplified illustration of another example of a power capacitor.
Figure 5:
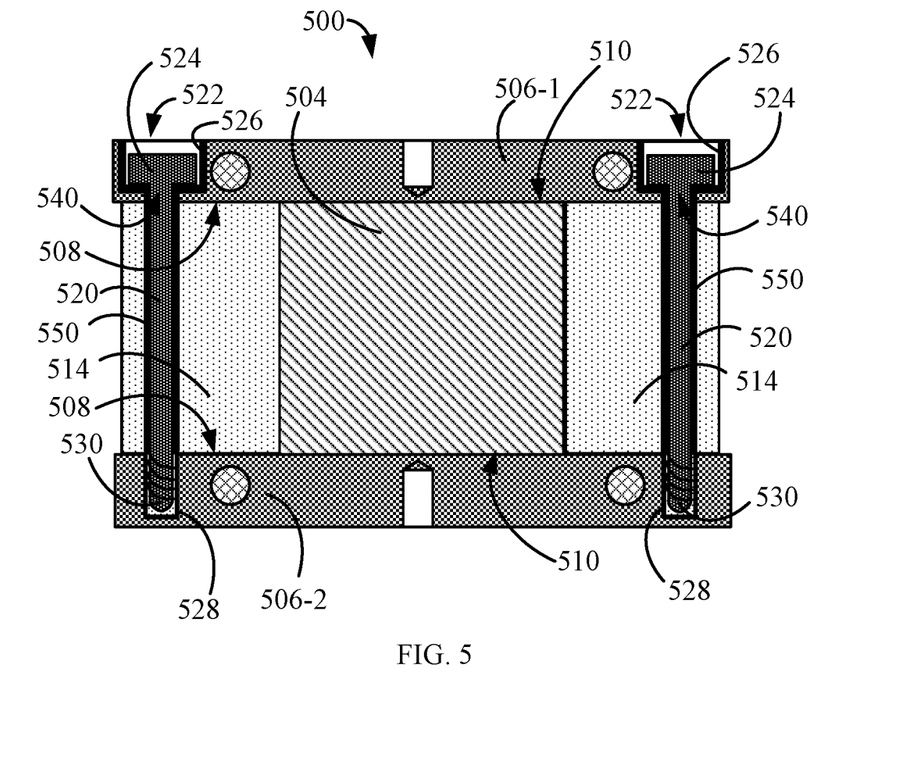
FIG. 5 is a cross-section view simplified illustration of yet another example of a power capacitor.

Since some metals such as, for example, copper and aluminum, cannot be soldered directly to each other, in soldered power capacitors known in the art (FIGS. 1A and 1B) an intermediate bonding material such as copper or tin-zinc powder must be added by, for example, arc spray over the capacitor body contact surface thus creating additional interfaces and thermal junctions. In all of the AC power capacitors disclosed in the current disclosure the components (i.e., capacitor body and electrodes) of the assembled AC power capacitors can be bound together solely by a compressive force that provides the functional contact between the capacitor elements (i.e., body and electrodes) negating the need for such an intermediate bonding material (FIGS. 3 and 5).

Electrodes 206 can also include a rim 220 (FIG. 2C), so that when in contact with capacitor body contact surface 210, electrodes 206 are maintained in place, urged against and bound to capacitor body contact surface 210 under compressive force applied by housing 202 to electrode 206 rim 220. Pressure applied by housing 202 to capacitor 200 is applied concurrently to rims 220 of each of electrodes 206 located on opposite sides of capacitor 200.

The magnitude of pressure under which electrodes 206 are maintained in contact with capacitor body contact surface 210 depends on the dimensions of the capacitor bobbin 204 and electrodes 206. The pressure maintained should be sufficient to allow uniform good electrical and thermal conductive contact throughout a contact plane parallel to and between electrodes 206 contact surface 208 and capacitor body contact surface 210. The more uniformly distributed the contact—the less the formation of thermal junctions, the less energy loss, the less the heat generation and the higher the efficiency of capacitor 200.

The magnitude of compressive force under which electrodes 206 are maintained in contact with capacitor body contact surface 210 is limited only by the value of applied force at which bobbin 204 (the capacitor body) will succumb to the compressive force and collapse. For example, a capacitor having a bobbin with a diameter of 80 mm and an electrode diameter of 80 mm can be maintained at a pressure between 5 kg/sqcm and 10 kg/sqcm.

Housing 202 could also envelope a potting 214 between bobbin 204 and housing 202 wall 222.

The configuration of capacitor 200 can provide good electric and heat conduction attributed to the large uniform contact area created between electrodes 206 contact surface 208 and capacitor body contact surface 210 bound together solely under a compressive force negating the need for redundant material interfaces such as an electric and heat conductive layer 212 and thermal junctions by negating the need for soldered contact points 108 (FIGS. 1A and 1B).

Reference is now made to FIG. 3, which is a cross-section view simplified illustration of another example of a power capacitor. Power capacitor 300, which is an alternating current (AC) capacitor includes two or more capacitor bodies 300-1 and 300-2 each similar in construction to capacitor 200 of FIGS. 2A and 2B and arranged in series.

Capacitor bodies 300-1 and 300-2 can be connected via a common electrode 306 having one or more electrode contact surfaces 208 disposed between capacitor bodies 300-1 and 300-2 and housed together in housing 302.

Any attempt to solder common electrode 306 to one or both bobbins 204 of capacitor bodies 300-1 and 300-2 would result in damage to one or both capacitor bodies 300-1 and 300-2 for reasons described above. Hence, electrodes 206 and common electrode 306, when in contact with capacitor body contact surface 210 can be maintained in place under compressive force by housing 302. The magnitude of compressive force under which electrodes 206/306 are maintained in contact with capacitor body contact surface 210 depends on the dimensions of the capacitor bobbins 204 and electrodes 206/306. The pressure maintained should be sufficient to allow uniformly distributed good electrical and thermal conductive contact throughout a contact plane between electrodes 206/306 contact surface 208 and capacitor body contact surface 210. The more uniform the contact—the less the formation of thermal junctions, the less energy loss and the less heat generation and the higher the efficiency of capacitor 200.

The magnitude of compressive force under which electrodes 206/306 are bound to and maintained in contact with capacitor body contact surface 210 is only limited by the value of pressure at which bobbins 204 will succumb to the compressive force and collapse. For example, a capacitor having a bobbin with a diameter of 80 mm and an electrode diameter of 80 mm can be maintained at a pressure between 5 kg/sqcm and 10 kg/sqcm.

Housing 302 could also envelope a potting 214 between bobbins 204 and housing 202 wall 222. In FIG. 3, electrodes 206/306 contact surface 208 and capacitor body contact surface 210 can be directly bound to each other negating the need for an electric and heat conductive layer 212.

The configuration of capacitor 300 can provide good electric and heat conduction attributed to the large uniformly distributed contact area created between electrodes 206/306 contact surface 208 and capacitor body contact surface 210 solely by a compressive force generated by housing 302 negating the need for redundant material interfaces and thermal junctions such as soldered contact points 108 (FIGS. 1A and 1B).

Figure 4A:
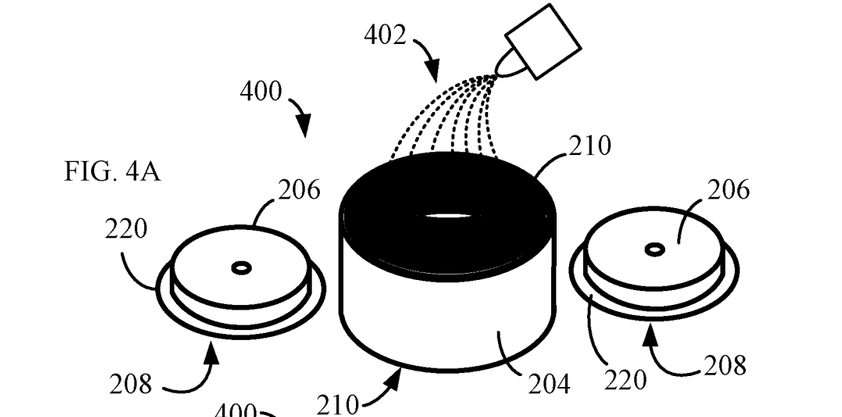
FIGS. 4A, 4B, 4C, 4D and 4E are perspective view simplified illustrations of a method of manufacture of a power capacitor.

As shown in FIGS. 4A, 4B, 4C, 4D and 4E, which are perspective view simplified illustrations of a method of manufacture of an alternating current (AC) power capacitor such as the power capacitors shown in FIGS. 2A, 2B and 3, a power capacitor 400 body contact surface 210 can optionally be arc sprayed with an electrical and heat conductive material 402 selected from a group of materials including copper and a zinc-tin mixture (FIG. 4A).

As explained above, the step described in FIG. 4A is optional and contact between electrodes 206/306 contact surface 208 and capacitor body contact surface 210 can be generated and maintained solely by a compressive force negating the need for an electrical and heat conductive material 402.

Figure 4B:
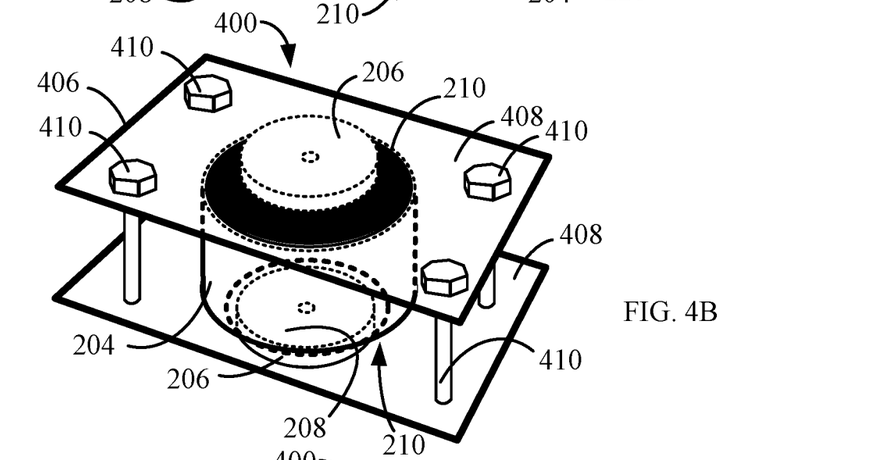
Figure 4C:
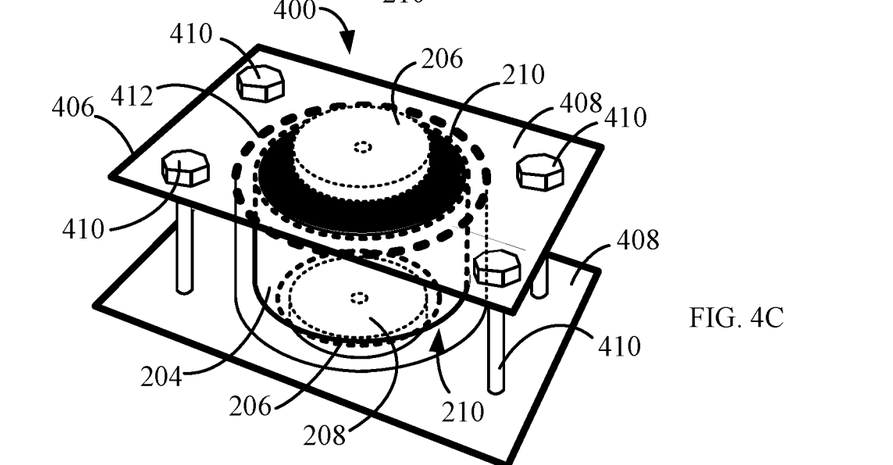
Figure 4D:
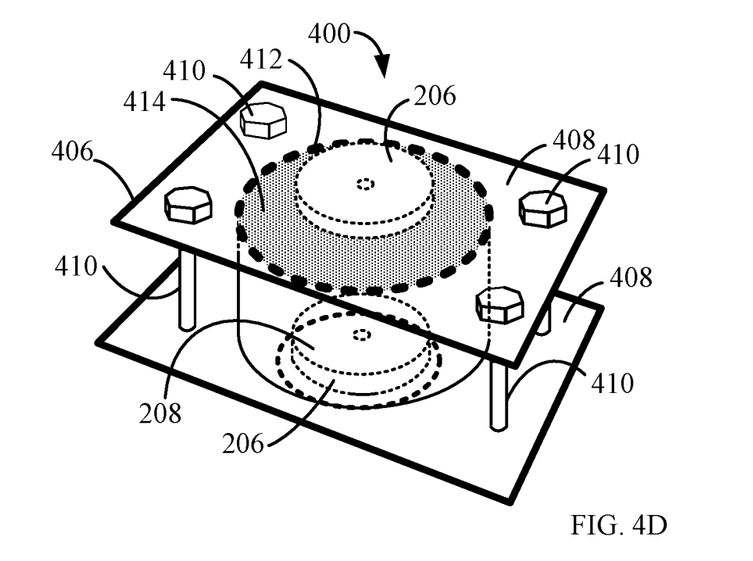

Two or more electrodes 206 and capacitor bobbin 204 can be arranged abutting each other, one electrode 206 contact surface 208 abutting each power capacitor body contact surface 210 to produce to be assembled capacitor 400, which can be then placed in a jig 406 between two moveable parallel plates 408 attached to each other by one or more bolts 410. Bolts 410 can be adjusted to maintain plates 408 parallel to each other (FIG. 4B). Joined electrodes 206 and capacitor bobbin 204 does not yet establish sufficient electrical contact there between so as to make capacitor 400 fully functional.

Bolts 410 can then tightened to bring jig plates 408 towards each other and apply on to electrode 206 joined with both flat sides of capacitor body 204 compressive force the vector of which can be parallel to axis (W) and normal to capacitor body contact surface 210 and bind electrodes 206 and capacitor body 204 together, establish and maintain uniform functional electrical and thermal conductive contact throughout a plane parallel to and between the electrode contact surface and capacitor body contact surface, making capacitor 400 fully functional.

The compressive force on capacitor 400 can be applied from the outside-inwards towards the core of capacitor 400 by contact between jig 406 plates 408 and electrodes 206. Plates 408 do not contact capacitor 404 bobbin 204 or any other part of capacitor 400 other than electrodes 206.

While still under compressive force applied by jig 406 plates 408, capacitor 400 can be encapsulated by a ring 412 (FIG. 4C) and potting 414 (FIG. 4D) between ring 412 and bobbin 204, both made of an electrically isolating material such as, for example, polyurethane sheet and polyurethane resin, together forming housing 202 having a wall 222 (FIGS. 2C and 3).

The encapsulation can be applied to capacitor 400 so that during the encapsulating process, potting 414 (FIG. 4D) flows over and engulfs electrode 206 rim 220 including rim 220 in the encapsulation.

Figure 4E:
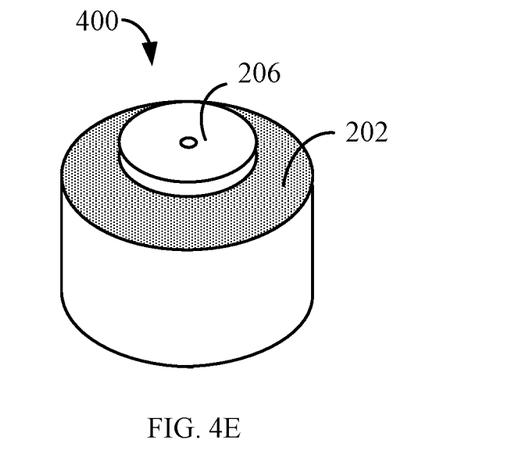

The closed jig 406 can be left to apply compressive force on capacitor 400 until the polyurethane encapsulation and potting are completely dry. Once encapsulation is dry, capacitor 400 can be removed from jig 406 (FIG. 4E). The contact between now bound together capacitor 400 electrodes 206 and bobbin 204 can be maintained under compressive force now applied by the mechanical strength of the polyurethane encapsulation of housing 202 to electrodes 206 rims 220 negating the need for soldered or mechanical contacts between electrodes 206 and one or more windings 230 or for an electrical and heat conductive material 402.

It will be appreciated by persons skilled in the art that the present method of manufacture of a capacitor as described above can also be applied to a capacitor having two or more capacitor bodies arranged in series such as the power capacitor described in FIG. 3 above.

Reference is now made to FIG. 5, which is a cross-section view simplified illustration of yet another example of a power capacitor.

AC Power capacitor 500 can include two or more electrodes 506-1/506-2 in a form of plates sandwiching capacitor body 504 that can be the form of layered-plates or a spool or bobbin.

Electrodes 506-1/506-2, when in contact with capacitor body contact surface 510 can be bound to and maintained in place under compressive force applied to electrodes 506-1/506-2 plates by bolts 520 urging electrodes 506-1/506-2 plates against capacitor body contact surface 510 on either sides of capacitor body 504 in a direction normal to capacitor body contact surface 510.

Electrode 506-1 can include one or more holes 530 operative to accommodate one or more bolts 520 and screw-head seats 522 operative to accommodate one or more bolts 520 heads 524. The interior walls 526 of seat 522 can be coated with an electrically isolating material so that when screw heads 524 are tightened and are urged against seats 522, no electrical contact is established between bolts 520 and electrode 506-1.

Power capacitor 500 can also include sleeves 550 made of an electrically isolating material and operative to accommodate and electrically isolate bolts 520 as they are threaded an when in their final resting state.

Electrode 506-2 can include threaded sockets 528 operative to threadingly accommodate threaded ends 530 of bolts 520 so that when bolts 520 are threadingly rotated into threaded sockets 528, bolts 520 urge electrodes 506-1 and 506-2 towards each other and against the capacitor body 504 generating a compressive force and maintaining uniform electrical and thermal conductive contact throughout a plane parallel to and between the electrode contact surface 508 and capacitor body contact surface 510. Threaded sockets 528 can be electrically conductive and be in direct electrical contact with threaded ends 530 of bolts 520.

The magnitude of pressure under which electrodes 506-1/506-2 are maintained in contact with capacitor body contact surface 510 depends on the dimensions of the capacitor body 504 and electrodes 506-1/506-2. The pressure maintained should be sufficient to allow uniformly distributed good electrical and thermal conductive contact throughout an contact plane between electrodes 506-1/506-2 contact surface 508 and capacitor body contact surface 510. The more uniform the contact—the less the formation of thermal junctions, the less energy loss and the less heat generation and the higher the efficiency of capacitor 500.

The magnitude of pressure under which electrodes 506-1/506-2 in contact with capacitor body contact surface 510 are maintained is only limited by the value of pressure at which capacitor body 504 will collapse. For example, a capacitor having a bobbin with a diameter of 80 mm and an electrode diameter of 80 mm can be maintained at a pressure between 5 kg/sqcm and 10 kg/sqcm.

The configuration of power capacitor 500 can provide good electric and heat conduction attributed to the large uniform contact area created between electrodes 506-1/506-2 contact surface 508 and capacitor body contact surface 510 solely by the compressive force generated by electrodes 506-1 and 506-2 urged against capacitor body 504 eliminating redundant material interfaces and thermal junctions bringing about the lack of redundant material interfaces and thermal junctions negate the need for soldered contact points 108 (FIGS. 1A and 1B).

A method of assembly of power capacitor 500 can include the following steps:

Joining a first electrode 506-1 and a second electrode 506-2 with corresponding capacitor body contact surfaces 510, each electrode 506-1/506-2 abutting an opposite side of capacitor body 504; Inserting one or more bolts 520 through holes 540 on the first electrode 506-1 and rotatingly threading bolts 520 into threaded sockets 528 on second electrode 506-2 so that when bolts 520 are rotated, first electrode 506-1 and second electrode 506-2 are urged towards each other and against both sides of capacitor body 504 in a direction normal to capacitor body contact surface 510, applying a compressive force against capacitor body 504 to a point at which the compression force is sufficiently large to maintain uniform electrical and thermal conductive contact throughout a plane parallel to and between electrode 506-1/506-2 contact surface 508 and capacitor body contact surface 510; and Encapsulating capacitor body 504 with a potting 514 so that only electrodes 506-1/506-2 remain exposed to the environment.

Figure 6:
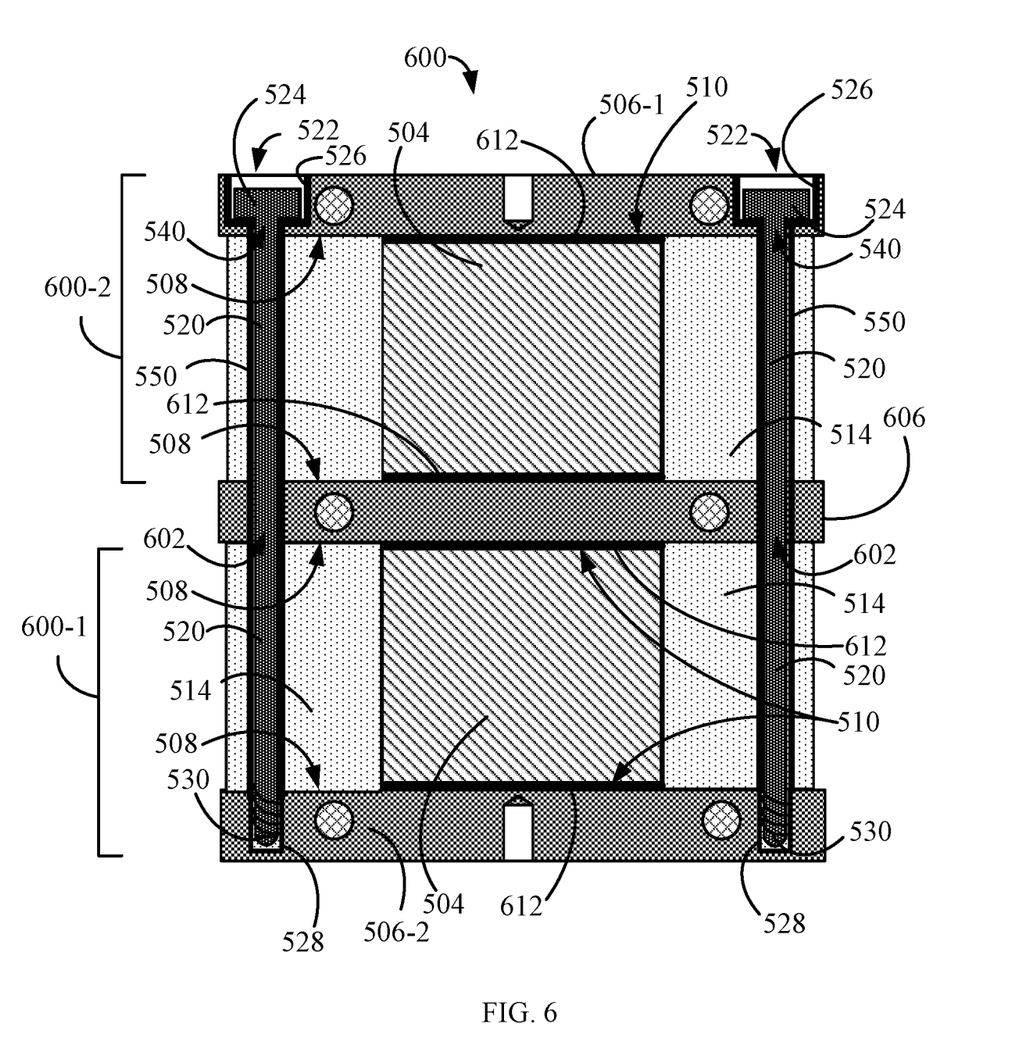
FIG. 6 is a cross-section view simplified illustration of still another example of a power capacitor.

Referring now to FIG. 6, which is a cross-section view simplified illustration of still another example of a power capacitor. AC Power capacitor 600, which is a capacitor includes two or more capacitor bodies 600-1 and 600-2 each similar in construction to capacitor 500 of FIG. 5 and arranged in series.

Capacitor 600 can include capacitor bodies 600-1 and 600-2 that can be connected via a common electrode 606. Common electrode 606 can include through-holes 602 operative to enable bolts 520 to be inserted freely through common electrode 606. Power capacitor 600 can also include sleeves 550 made of an electrically isolating material and operative to accommodate and electrically isolate bolts 520 as they are threaded through common electrode 606 and in their final resting state.

Any attempt to solder common electrode 606 to one or both bodies 504 of capacitor bodies 600-1 and 600-2 would result in damage to one or both capacitor bodies 600-1 and 600-2 for reasons described above. Hence, electrodes 506-1/506-2 and common electrode 606, when in contact with capacitor body contact surface 510 can be maintained in place under compressive force by bolts 520.

The magnitude of pressure under which electrodes 506-1/506-2/606 are maintained in contact with capacitor body contact surface 510 depends on the dimensions of the capacitor bobbin 504 and electrodes 506-1/506-2/606. The pressure maintained should be sufficient to allow uniformly distributed good electrical and thermal conductive contact throughout a contact plane between electrodes 506-1/506-2/606 contact surfaces 508 and capacitor body contact surface 510. The more uniform the contact—the less the formation of thermal junctions, the less energy loss and the less heat generation and the higher the efficiency of capacitor 600.

Capacitor 600 can also optionally include an electric and heat conductive layer 612 between electrodes 506-1/506-2/606 contact surfaces 508 and capacitor body contact surface 510.

Power capacitor 600 can be then encapsulated in a manner described above.

It will be appreciated by persons skilled in the art that the present systems methods are not limited to what has been particularly shown and described hereinabove. Rather, the scope of the method and system includes both combinations and sub-combinations of various features described hereinabove as well as modifications and variations thereof which would occur to a person skilled in the art upon reading the foregoing description and which are not in the prior art.

What is claimed is:

1. An AC Capacitor, comprising:
   at least one capacitor body having conductive and dielectric film windings and wherein an edge of the conductive film windings defines a plane normal to a concentric axis (W) of the windings forming at least one capacitor body contact surface;
   a pair of electrodes sandwiching the capacitor body with each electrode having at least one electrode contact surface; and
   wherein the pair of electrodes is urged against the capacitor body contact surface to apply compressive force, operative to bind the capacitor body contact surface and the electrode contact surface together so as to maintain uniform electrical and thermal conductive contact throughout a plane parallel to and between the electrode contact surface and capacitor body contact negating the need for an intermediate bonding material.

2. The AC capacitor according to claim 1, wherein the compressive force is the sole force that provides a functional contact between the capacitor body and the electrode contact surface.

3. The AC capacitor according to claim 1, wherein the compressive force is a vector which is parallel to axis (W) and normal to capacitor body contact surface.

4. The AC capacitor according to claim 1, wherein the electrodes include at least one through hole.

5. The AC capacitor according to claim 1, wherein magnitude of the compressive force is limited only by value of applied force at which the capacitor body will succumb to the compressive force and collapse.

6. The AC capacitor according to claim 1, wherein at least one bolt urges the pair of electrodes towards each other.

7. The AC capacitor according to claim 1, wherein the electrical and thermal conductive contact throughout a plane parallel to and between the capacitor body contact surface and the electrode contact surface is solder free.

8. An AC Capacitor, comprising:
   at least one capacitor body having conductive and dielectric film windings and wherein an edge of the conductive film windings defines a plane normal to a concentric axis (W) of the windings forming at least one capacitor body contact surface;
   a pair of electrodes sandwiching the capacitor body with each electrode having at least one electrode contact surface; and
   wherein the pair of electrodes include a plurality of holes configured to receive a plurality of bolts and wherein the pair of electrodes under application of a compressive force is configured to move towards each other in a direction normal to capacitor body contact surface and to establish a solder free electrical and thermal conductive contact between capacitor body contact surface and at least one electrode contact surface.

9. An AC Capacitor, comprising:
   at least one capacitor body having conductive and dielectric film windings and wherein an edge of the conductive film windings defines a plane normal a concentric axis (W) of the windings forming at least one capacitor body contact surface;
   a pair of electrodes sandwiching the capacitor body with each electric having at least one electrode contact surface; and
   wherein the pair of electrodes include a plurality of holes configured to receive a plurality of bolts;
   wherein tightening of the plurality of bolts forces the pair of electrodes to move towards each other in a direction normal to capacitor body contact surface and parallel to axis (W) and apply to the pair of electrodes and capacitor body contact surfaces a compressive force, and to establish a solder free electrical and thermal conductive contact between capacitor body contact surface and at least one electrode contact surface.

* * * * *